United States Patent [19]
Engel et al.

[11] Patent Number: 4,758,887
[45] Date of Patent: Jul. 19, 1988

[54] CONFERENCE TABLE

[75] Inventors: Hartmut S. Engel, Freiberg a/N Designer; Karl H. Weyel; Hans D. Weyel, both of Haiger Geschaeftsfuehrer, all of Fed. Rep. of Germany

[73] Assignee: Weyel KG, Haiger, Fed. Rep. of Germany

[21] Appl. No.: 916,252

[22] Filed: Oct. 7, 1986

[30] Foreign Application Priority Data

Oct. 9, 1985 [DE] Fed. Rep. of Germany ....... 3536044

[51] Int. Cl.$^4$ ............................................... H04N 7/14
[52] U.S. Cl. ...................... 358/85; 358/185; 358/335; 360/33.1; 379/53; 379/202
[58] Field of Search ............... 358/335, 85, 83, 86, 358/185; 360/33.1; 379/202-206, 53, 54

[56] References Cited

U.S. PATENT DOCUMENTS

| | | | |
|---|---|---|---|
| 4,184,048 | 1/1980 | Alcaide | 379/206 |
| 4,400,724 | 8/1983 | Fields | 358/85 |
| 4,516,156 | 5/1985 | Fabris et al. | 358/85 |

Primary Examiner—Donald McElheny, Jr.
Attorney, Agent, or Firm—Flynn, Thiel, Boutell & Tanis

[57] ABSTRACT

Picture-screen apparatus are integrated into a conference table to be viewed by conference participants. The conference table is suited both for video conferences with conference participants who are at different locations and also for normal conferences with participants who are all present at the table. Television cameras needed for video conferences can be removed from the surface of the table, if the table is to be used for normal conferences. The picture-screen apparatus arranged below the table top do not interfere during normal conferences and can also be utilized for bringing visual information of any kind to the participants.

20 Claims, 5 Drawing Sheets

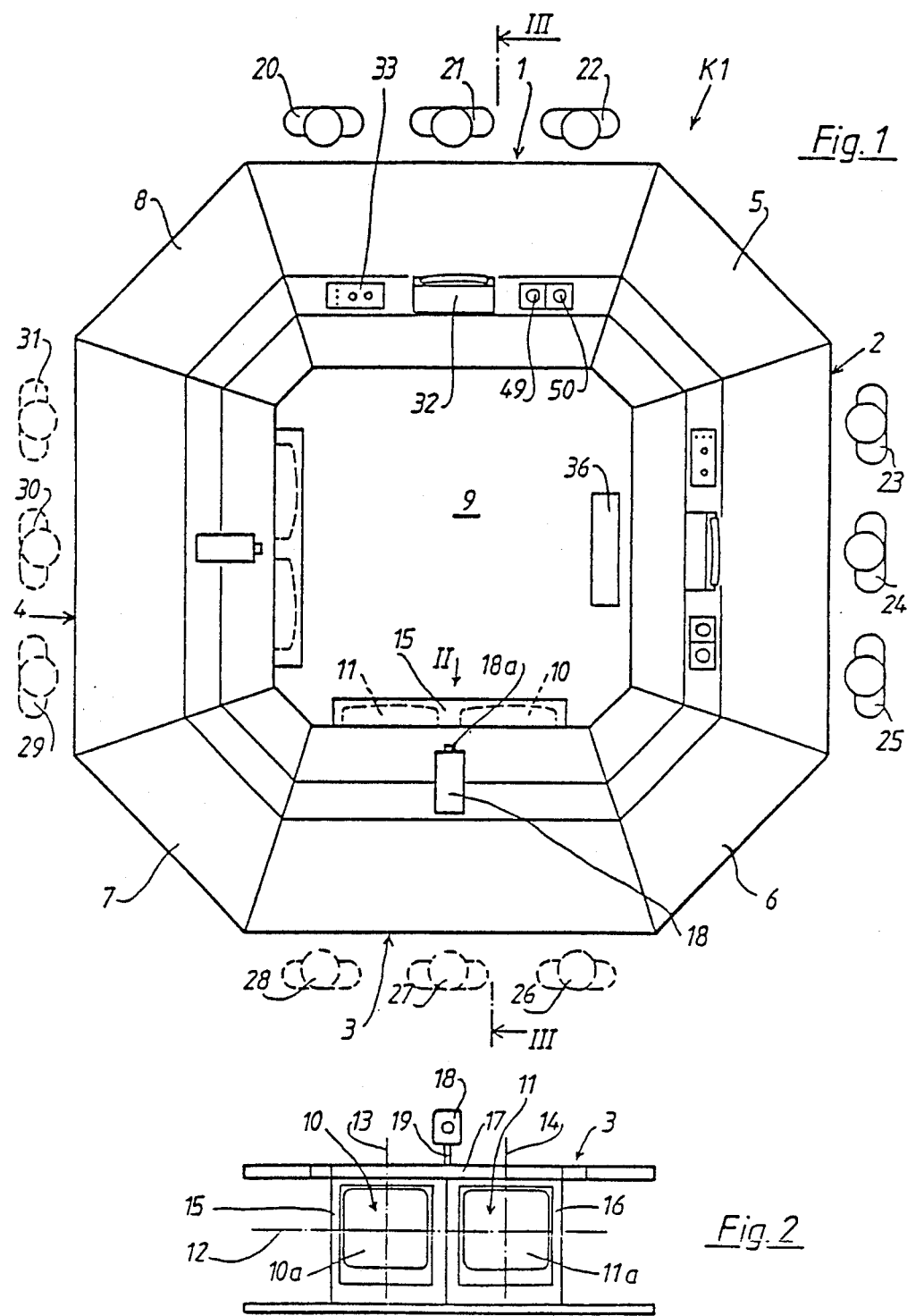

CONFERENCE TABLE

FIELD OF THE INVENTION

The invention relates to a conference table comprising at least two opposed (oppositely lying) table elements, which are separated by a space, whereby each table element has an inner side defining the space and an outer side opposite the inner side, on which outer side is provided at least one work place for a conference participant.

BACKGROUND OF THE INVENTION

Conference tables are typically designed such that conference participants sit across one another. Such a seating arrangement is favorable for communication purposes, since the discussion partners can see one another, so that mimic and gesture can come into play. Increasingly audiovisual apparatus also have an important role in conferences, with which apparatus information can be transmitted by picture and also by sound. Today, conferences between participants which are at various locations are also possible with the help of television techniques. Such type of conferences are also identified as video conferences.

Known is a media vehicle (Brochure AVE 4421.1, Edition 1/84 of the Firm Weyel), in which a monitor and a videorecorder are stored advantageously. Cable running between the apparatus stored in the media vehicle are laid in the vehicle. A media vehicle already makes it possible to transmit during a conference also information with moving pictures. However, during use in conferences, aside from the conference table and the associated seating a still further piece of equipment is needed, namely, the media vehicle, which needs a certain amount of space and to which also a cable must lead. The design of the media vehicle does not always fit the design of a conference table, which in particular in representative conference rooms is not desired. A projection wall cannot be used on a media vehicle, so that for example overhead projectors must project onto a wall.

Also known is a wall for audiovisual media (Brochure AVE 4430, Edition 1/84 of the Firm Weyel), which has both monitors and videorecorders and also projection walls for illuminated pictures. Projection surfaces are also provided, on the back side of which pictures can be projected. The wall is fixedly installed, so that during its use all conference participants must look toward the wall. A room with such a wall is not well suited for smaller groups.

Also known are video conference rooms (Brochure AVE 3001 of the Firm Weyel, German OS No. 33 17 414). Picturescreen apparatus are provided on a fixed wall, on which apparatus can be seen conference participants from a different place. A conference table is positioned in front of the wall. Work places for the conference participants are provided only on one side of the table. These present conference participants sit in the field of vision of television cameras which monitor and have transmitted pictures to be viewed on the picture-screen apparatus by the nonpresent conference participants. A conference room of this type can only be used for video conferences and not also for normal conferences during which all participants are at the same place. The conference room thus generally is utilized only very little. The present conference participants must constantly look toward a wall during a video conference.

Also known is a conference table of the abovementioned type (German OS No. 34 03 345, FIG. 1), in which rectangular and quarter-ring-shaped table elements and attachment units are assembled between the table elements to form a C-shaped complete table. The attachment units contain technical devices, namely a microphone, a speaker and lights. Visual aids are not provided.

The basic purpose of the invention is to provide a conference table such that, if needed, audiovisual information can also be monitored.

The conference table created to attain this purpose is characterized by at least one picture-screen apparatus arranged on the inner side of a table element below the table top and the picture screen of which lies in the range of view of the conference participant, whose work place is at the opposite table element.

A so constructed conference table can be used for the usual conferences, namely also if no audiovisual information is to be monitored. This is possible because the picture-screen apparatus lies constantly below the plane of the table top. Whereas, if needed, audiovisual information can be brought into the discussion.

In a preferred embodiment of the invention, at least one picture-screen apparatus is arranged on the inner side of each table element, so that a picture-screen apparatus can be seen from each work place. Possibly excluded may be a control table element. The conference participant sitting across from the table element may then view pictures on the picture-screen apparatus provided on the table elements arranged laterally from the control table element. The storing of a picture-screen apparatus on a control table element may possibly not work since the space below the table top is taken up by other apparatus.

Particularly preferable is a ring-shaped construction of the conference table. Such a ring-shaped table can be formed particularly preferably of eight trapezoidal table elements, which form together a regular octagon. Up to sixteen conference participants can be seated at such a table, which is sufficient in most cases. An octagon table can be easily manufactured of such a size that the picture-screen apparatus are spaced favorably from the seats of the conference participants, who sit at the diametrically opposite table elements.

It is also possible to provide four table elements. In order to obtain a closed ring also with four table elements, it is possible to provide fill elements. A preferable size is provided when three work places for conference participants are arranged at each table element. In the case of a video conference, six persons can then sit at the conference table, namely preferably at table elements positioned perpendicularly to one another. Further, conference participants can find space at the other table elements. These participants are then, however, not visible at the other place, thus participate only indirectly in the video conference.

Further embodiments for the design of the table are possible. In the simplest case, the table consists of two separate table elements which are opposite one another. Possible is also a U-shaped table construction, whereby the table elements are formed by the legs of the U.

The preferable distances between picture-screen apparatus and the diametrically opposed outer side of a table element is 2 m. to 5 m., preferably in the range of 2.55 m. to 3.25 m., preferably approximately 2.90 m. A general rule is, that the distance can be larger with an increase in size of the picture-screen apparatus. Since, however, the picture-screen apparatus cannot project above the table top, the picture-screen size is limited.

As has already been mentioned above, two work places per table element are particularly advantageous if the table is an octagon. Particular table element dimensions are advisable in this case, such as the length of an outer side being in the range of 0.8 m. to 2.4 m. (preferably 1.6 m.) and the depth being in the range of 0.6 m. to 1.5 m. (preferably 1 m.).

The picture-screen apparatus lie advantageously at least partly below the table top of the associated table element. The table tops of the table elements can be constructed easily sufficiently deep that even if the picture-screen apparatus are stored in this manner there remains still sufficient leg freedom for the conference participants. Each picture-screen apparatus is advantageously surrounded by a frame, which also brings about optical advantages, since reflections are prevented.

The inclination of the picture screens of the picture-screen apparatus can preferably be adjusted. This permits an optimum orientation of the apparatus and thus an optimum monitoring of information.

The picture-screen apparatus are preferably electron-beam picture-screen apparatus. Electron-beam picture-screen apparatus are in today's state of technical development needed, for example, for video conferences. However, conceivable is also the use of picture-screen apparatus onto which pictures are optically projected from the back side. Also picture-screen apparatus can be used, the image points of which can be projected onto the screen with the help of photoconductors.

According to a further preferable development of the invention, at least one reading camera is provided, which is directed onto the table surface of a table element. Originals, onto which the reading camera is directed, can in this manner be transmitted onto the picture-screen apparatus. For an optimum adjustment of the reading camera, same is held preferably on a liftable and lowerable tripod. The tripod can be moved by means of an electric motor. The reading camera is preferably also pivotal.

All installations for the operation of the diverse apparatus are preferably stored in the conference table. This has the advantage that exposed cable does not exist and "cable bundles" are avoided. A control desk can also be provided on the conference table, so that a control of all functions by the conference participant is possible.

The conference table is preferably also equipped with a picture scanner for transmission of pictures onto the picture-screen apparatus. Thus, the picture-screen apparatus can also be utilized for illustration of pictures which are not stored electronically, but for example are available only in the form of diapositives or the like.

A control mechanism with a distributor is preferably provided, at the input side of which diverse apparatus are connected and at the output side of which the picture-screen apparatus are connected. The picture-screen apparatus can hereby be divided into two groups. It is particularly preferable when the distributor and the apparatus connected thereto are stored in the table itself, preferably in a control table element on which is also provided the control desk.

Further developments of the invention make the conference table in particular also suited for video conferences, thus for conferences where for example two groups of conference participants are in different locations. At least one television camera is provided which is directed toward the conference participant or participants. This has made it possible to use a conference room, which is being used for the usual conferences, also for video conferences. This permits a substantially better utilization of the conference room than has been the case for a purely video conference room, which heretofore would only be used occasionally. The television camera would for reasons of the angle of view be arranged relatively high and is therefore preferably removable from the table top or can be positioned below the plane of the table top.

A control monitor is also advantageously provided. The conference table is thus optimized for use during video conferences. The close arrangement of the control monitor to the conference participant is particularly advantageous and permits in particular a small construction of the control monitor. When the control monitor is arranged near the conference participant, an upwardly angled position of the picture screen is particularly advantageous. The control monitor is preferably embedded into the table top, which has the advantage that the field of vision of the conference participant is not blocked by the control monitor.

BRIEF DESCRIPTION OF THE DRAWINGS

Exemplary embodiments of the invention are illustrated in the drawings, in which:

FIG. 1 is a top view of circular conference table;

FIG. 2 is an elevational view of an inner side of a table element of the conference table according to FIG. 1;

DETAILED DESCRIPTION

Figure 3:
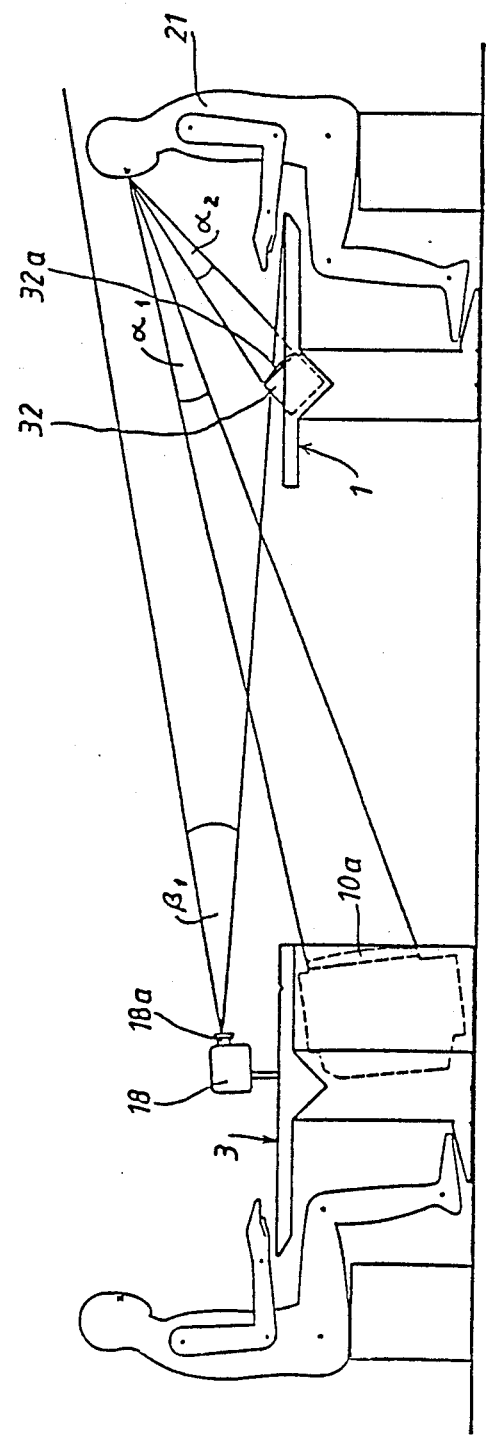
FIG. 3 is a vertical cross-sectional view of the conference table taken along the line III—III of FIG. 1, however, the table elements which are in the background are not illustrated for purposes of clarity.

The conference table $K_1$ according to FIGS. 1 to 3 is of a ring-like construction. The ring is formed by four table elements 1 to 4 and four filler elements 5 to 8. A space 9 exists within the ring-like arrangement of the table elements and the filler elements. The table elements 3, 4 are identified hereinafter as "monitor table elements", since picture-screen apparatus are arranged on the elements.

Two electron beam picture-screen apparatus 10, 11 are arranged on the back (inner) side of the monitor table element 3. Each of the picture-screen apparatus can be pivoted about a horizontal axis 12 and a vertical axis 13 or 14, so that the picture-screen apparatus can be moved into an optimum viewing position. Each picture-screen apparatus is surrounded by a frame 15 or 16.

A television camera 18 is arranged above the plane of the table top 17, which camera is carried by a column 19. The lens 18a of the television camera 18 is directed toward the diametrically opposite table element 1. The picture screens 10a, 11a are also facing the opposite table element 1 and are oriented such, namely are turned slightly upwardly, that the picture screens 10, 11 can be seen comfortably by the conference participants 20, 21, 22, which sit in front of the table element 1. On the other hand, the television camera 18 can pick up or monitor the conference participants 20, 21, 22. This is illustrated in FIG. 3 by showing the respective angle of view.

A necessary angle of view $\alpha_1$, as viewed from the side, occurs during a picking up or viewing of the entire height of the picture screens 10a, 11a by the participant. The arrangement of the table elements 1, 2 and their dimensions are such that the comfortably seated conference participant 21 can completely see the picture screens 10a, 11a. The angle of view of the television camera 18 must, as viewed from the side, have the angle of view $\beta_1$, in order to completely pick up or monitor the upper body of the conference participant 21.

A control monitor 32 is also provided in the table element 1, which control monitor is arranged near the conference participants 20, 21, 22. In particular, the conference participant 21 sitting in the middle can look perpendicularly onto the face of the picture screen 32a of the control monitor 32, as this can best be seen in FIG. 3. The angle of view needed for the complete picking up or viewing of the picture screen 32a is, seen in the side view, $\alpha_2$.

A control desk 33 is also provided on the table element 1, with which control desk the conference participant 20 or the conference participant 21 can control the various devices present at the conference table.

An acoustic communication device embodying a microphone and a speaker system 50 is furthermore provided on the table element 1. Of course, it is also possible to provide headphones in place of a speaker system.

Figure 4:
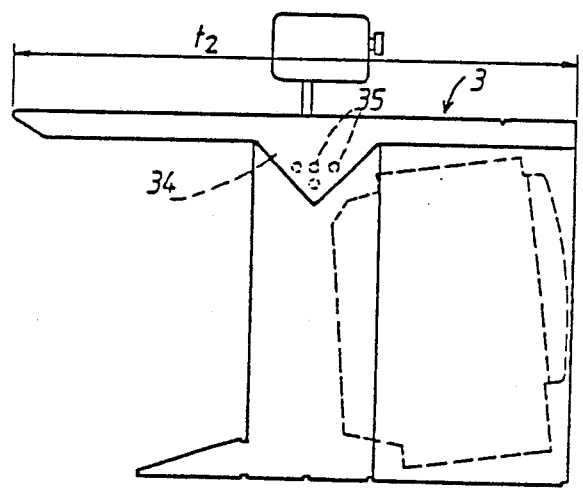
FIG. 4 is a side view of a table element, as it is used in the conference table according to FIG. 1.

The slightly enlarged side view according to FIG. 4 shows that the table element (it is assumed that FIG. 4 shows the table element 3) has a cavity 34 in which are contained cables 35 and other possible installations. The cables 35 connect the diverse picture-screen apparatus and cameras to the control desks 33. By storing cables and other installations directly in the conference table, exposed cable and other installation devices which could interfere with the use of the conference table and with its appearance are avoided.

The design of the conference table was discussed above using the example of the table elements 1 and 3. The table element 1 is constructed like the table element 2 and the table element 3 is constructed like the table element 4. The relative position between the table elements 2 and 4 is the same as between the table elements 1 and 2. In the arrangement according to FIG. 1, it is possible to have six conference participants 20 to 25 participate directly in a video conference, that is, they can be seen at a remote location whereat other participants of the video conference are located. An indirect participation is possible for the conference participants 26 to 31. They can, however, neither see the nonpresent conference participants nor are they picked up or monitored by the television cameras. However, they can participate in the conference by observing or also engage actively in the conference.

The conference table can also be used for common conferences. The cameras 18 are in this case either removed from the table or are recessed into the table, so that they do not interfere with eye contact with the oppositely sitting conference participants. It is possible to use the picture-screen apparatus 10, 11 also for those conferences, for example, to show data needed in connection with the subject matter of the conference. In order to show on the picture-screen apparatus 10, 11 illustrations which are not recorded electronically, as for example diapositives, a picture-scanning apparatus 36 is provided, with which pictures can be scanned electronically and are then shown on the picture-screen apparatus 10, 11.

Figure 5:
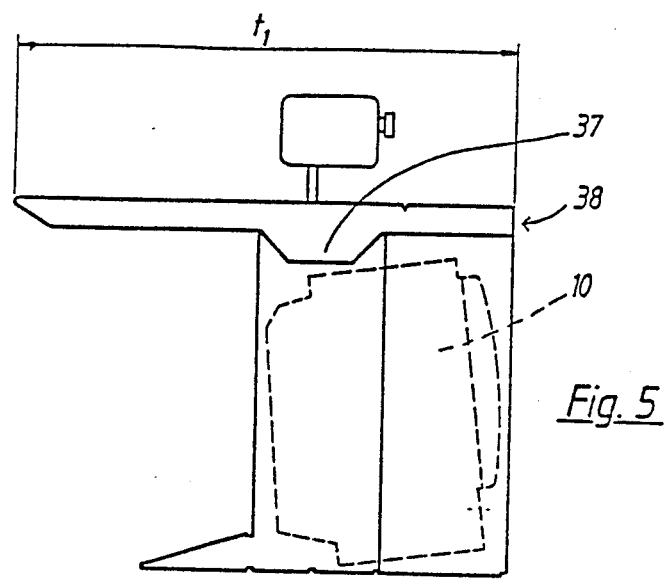
FIG. 5 is a side view of a modified table element.

FIG. 5 shows a table element modification 38 with the table element having a depth $t_1$, which is less than the depth $t_2$ of the table element according to FIG. 4. The picture-screen apparatus 10 is in this case moved farther in direction of the edge of the table at which sits the conference participant. To make this possible, the cavity 37 is constructed shallower than in the embodiment according to FIG. 4.

Figure 6:
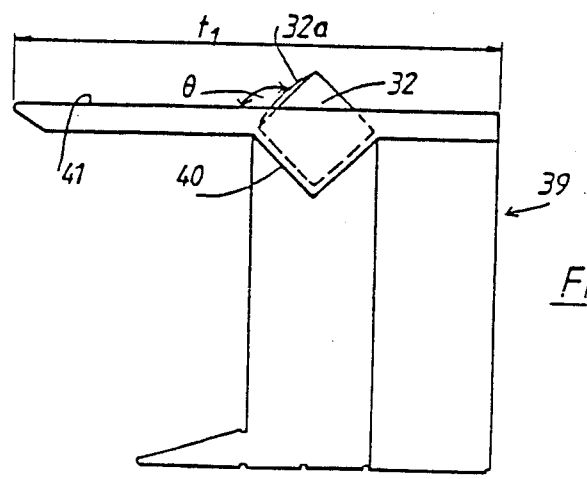
FIG. 6 is a side view of a table element into which a control monitor is installed.

The table element 39 according to FIG. 6 has a shorter depth $t_1$ than the table element 38 has. A cavity 40 has the same cross-sectional form as the cavity 34 in the table element 3 according to FIG. 4. A control monitor 32 is partially received in the cavity 40. Its picture screen 32a is turned so that it is inclined upwardly such that the picture screen 32 defines an angle $\theta 135°$ with the table top surface 41.

Figure 7:
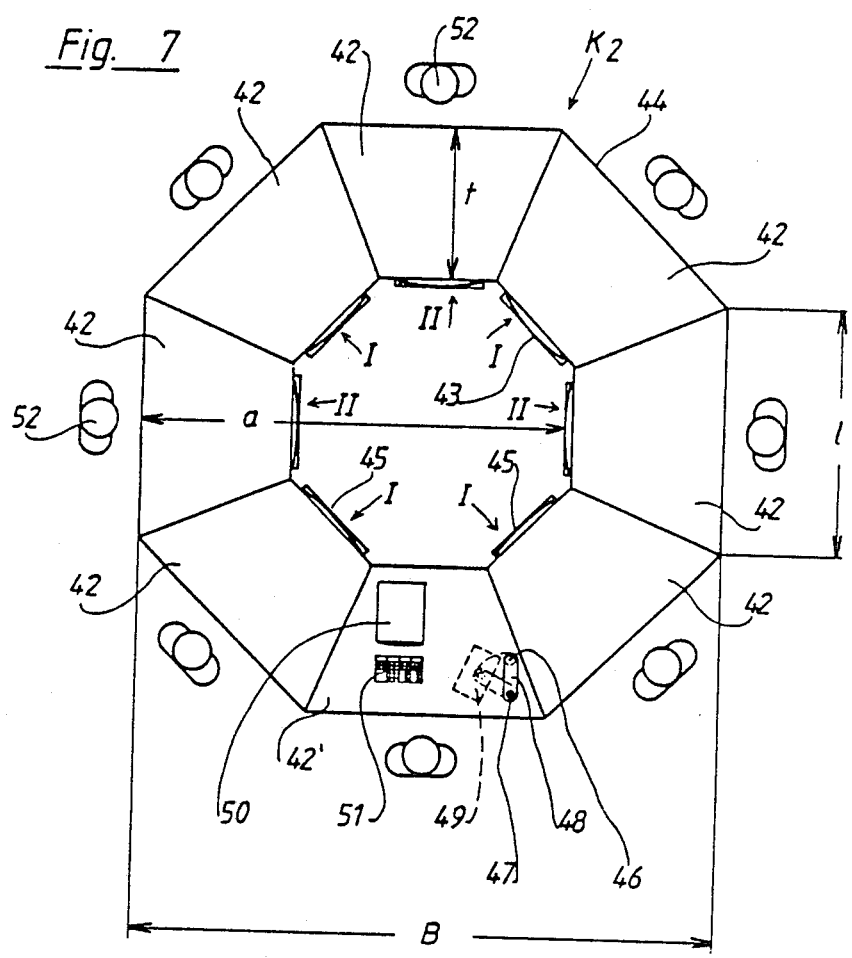
FIG. 7 is a top view of a conference table in the form of a regular octagon.
Figure 8:
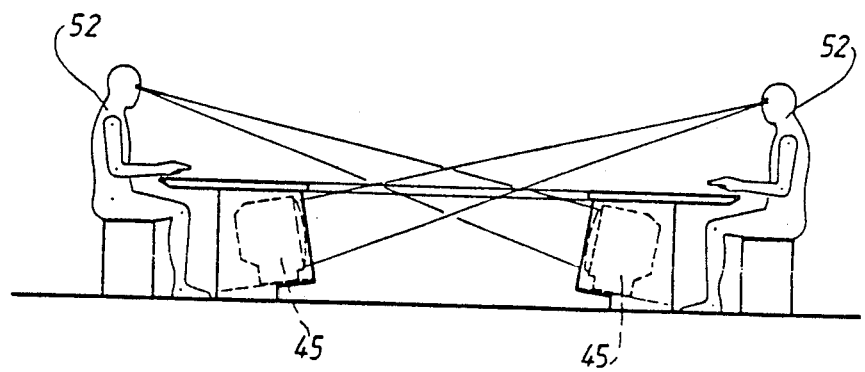
FIG. 8 is an illustration corresponding with FIG. 3 of the conference table according to FIG. 7.

The conference table $K_2$ according to FIGS. 7 and 8 has the shape of a regular octagon, which is composed of table elements 42 and 42'. Each table element has a trapezoidal table top with an inner side 43 and an outer side 44. A picture-screen apparatus 45 is provided on each table element 42, the arrangement of which picture-screen apparatus 45 within the table element can be seen in FIG. 8. Whereas, no picture-screen apparatus is provided on the table element 42', since the space below this table is occupied by other apparatus.

A reading camera 46, which is secured by an arm 48 to a tripod 47, is provided on the table element 42', which will be identified as a control table element. The tripod 47 can be lifted and lowered by means of a device having an electric motor, which device is not illustrated in the drawings. This structure makes it possible to change the distance of the reading camera from the table top of the table element 42'. The tripod 47 can also be swivelled. One swivelled position is illustrated in full lines and one in broken lines in FIG. 7. Thus a proper alignment and spacing of the reading camera with and from an original document 49 which is to be reproduced is possible.

A control monitor 50 is also provided on the table element 42', which monitor is supported similarly as already discussed earlier with reference to FIG. 6. A switchboard 51 for controlling the various installations at the conference table is provided on the control table element and will be discussed in greater detail below with reference to FIG. 9.

The conference table $K_2$ is particularly well suited for internal conferences. FIG. 8 demonstrates that each conference participant 52 can look comfortably at a picture-screen apparatus 45. Only the conference participant 52 who sits at the table element 42 opposite the control table element 42' must be satisfied with viewing the picture in one of the picture-screen apparatus 45 provided in the table elements 42 arranged on both sides of the control table element 42'. If the available space in the control table element 42' permits it, it is of course also possible to arrange a picture-screen apparatus there. This is, for example, the case if supplementary apparatus like a picture scanner or a videorecorder are not arranged within the table element 42'.

FIG. 7 illustrates a conference participant 52 at each table element 42, 42'. Eight conference participants can participate in the conference in this case. However, it is also possible for two conference participants to find space at each table element, so that all together sixteen conference participants are possible. This is for example possible, if the width B of the regular octagon lies in the range of approximately 3.55 m. to 4.25 m., for example at 3.90 m. A favorable distance a from one outer table edge to the opposite picture screen 45 is in the range of approximately 2.55 m. to approximately 3.25 m., preferably approximately 2.90 m. From this results a length 1 of a table element outer side 44 of approximately 1.60 m. A measurement of approximately 1 m. is particularly well suited for the depth t of a table top.

Figure 9:
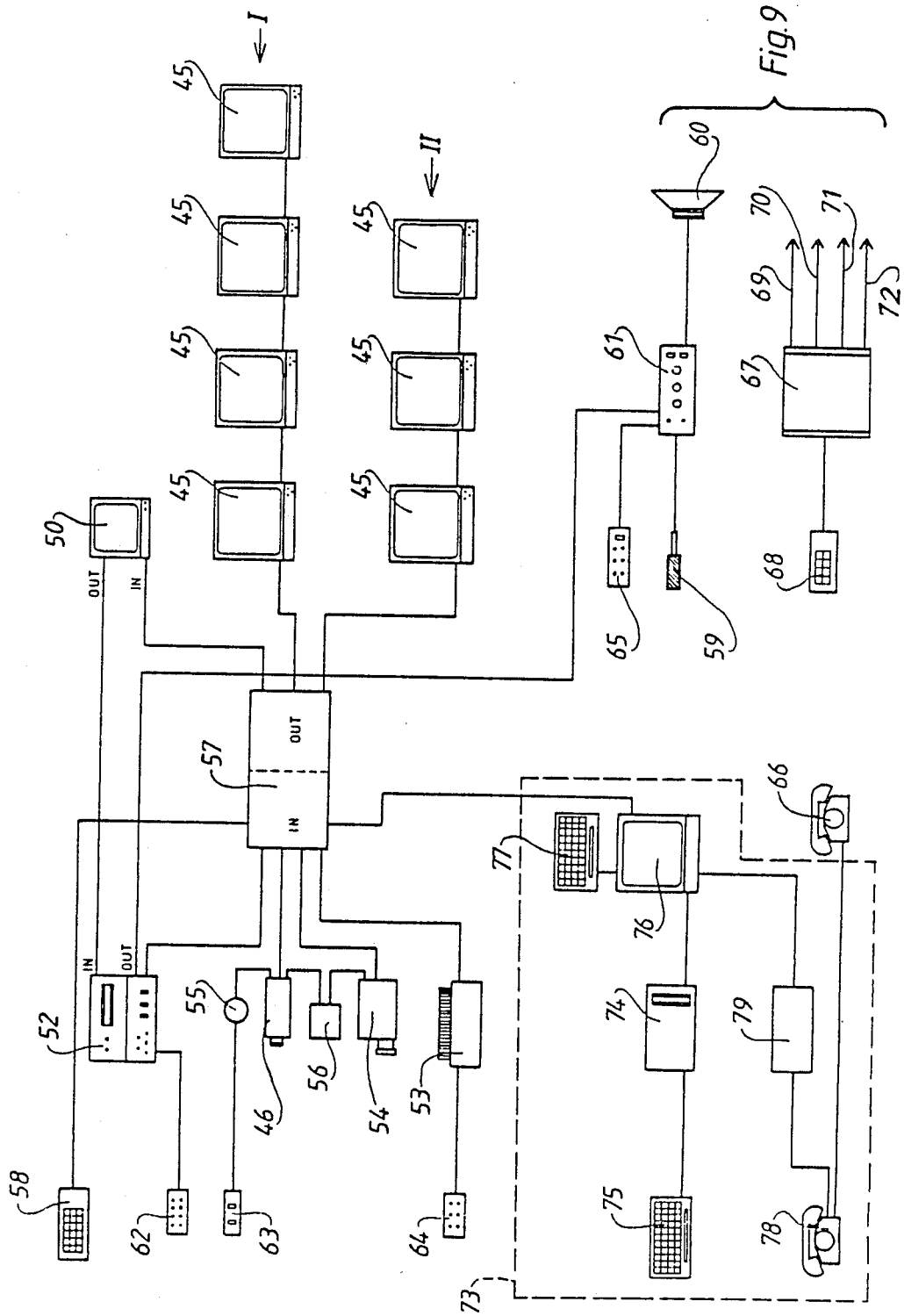
FIG. 9 is a schematic illustration of a control device for the diverse apparatus.

FIG. 9 shows schematically which installations can be arranged at the conference table. It is assumed that we are dealing with the installations at the conference table $K_2$ according to FIGS. 7 and 8.

A videorecorder, a picture-scanning apparatus 53, the already mentioned reading camera 46 and a television camera 54 are arranged in the control table element 42'. The circle 55 symbolizes the drive motor and associated drive for the lifting and lowering of the tripod 47. The supply of current to the apparatus is also schematically illustrated by the box 56 which indicates the electric circuit.

The diverse apparatus are arranged at the input (IN) side of a distributor 57, which can be controlled by means of control keys 58. The control monitor 50 and the picture-screen apparatus 45 are connected to the output (OUT) side. Four picture-screen apparatus 45 are combined to one group I and three picture-screen apparatus 45 to one group II. Which picture-screen apparatus belonging to the group I and which to the group II is shown in FIG. 7. The dividing of the picture-screen apparatus into groups makes it possible for different pictures to appear on picture-screen apparatus which lie side-by-side. Conference participants sitting opposite one another are able to view selectively the one or the other picture.

Part of the installation of the conference table involves also at least one microphone 59, one speaker system 60 and one sound amplifier 61. Keyboards for the diverse installed elements are also shown in FIG. 9 and are identified by the reference numeral 62 for the videorecorder 52, by the reference numeral 63 for the tripod, by the reference numeral 64 for the picture-scanning apparatus and by the reference numeral 65 for the sound system. All of these keyboards are combined in the switchboard 51 (see FIG. 7).

A telephone 66 is also provided at the table, and a switch unit 67 with associated keyboard 68 for controlling the equipment in the room where the conference table is. For example, the arrow 69 symbolizes the control of the lighting, the arrow 70 the control of the intensity of the lighting, the arrow 71 the control of the ventilation and the arrow 72 the control of any further desired function. The keyboard 68 can also be integrated into the switchboard 51.

Devices are illustrated within the box 73 shown in broken lines, which devices are not directly integrated into the conference table, but which for example are stored in an outer chamber. A microcomputer 74 with associated keyboard 75, a monitor 76 for information received through telephone lines (so-called Btx-monitor) with associated keyboard 77 and a Btx-telephone 78, which communicates through telephone modems 79 with the system, are illustrated. It is possible to connect through the telephone 66 provided on the conference table the apparatus in the box 73 through the distributor 57 to the picture screens 45.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a conference table comprising at least two oppositely positioned table elements separated by means defining a space, each table element having a table top and a first side facing said space and a second side opposite said first side, said second side being provided with means defining at least one work station for a conference participant, the improvement wherein at least one picture-screen apparatus is provided and includes means defining a picture screen arranged on said first side of a table element and at least partially below a plane of said table top, said picture-screen lying in the vision range of conference participants whose work station is at the opposite one of said table elements.

2. The conference table according to claim 1, wherein said table elements form an annular arrangement.

3. The conference table according to claim 2, wherein four table elements are provided and positioned rectangularly to one another.

4. The conference table according to claim 3, wherein said table elements have first trapezoidally-shaped table tops and fill elements having second trapezoidally-shaped table tops arranged between said first table elements.

5. The conference table according to claim 3, wherein said at least one work station includes means defining three locations for conference participants arranged at one table element, and wherein said picture-screen apparatus at said first side of the opposite one of said table elements includes two side-by-side picture-screen apparatus.

6. The conference table according to claim 5, wherein said picture-screen apparatus is arranged at two table elements which are positioned at a right angle to one another.

7. The conference table according to claim 1, wherein said picture-screen apparatus lies below said table top.

8. A conference table according to claim 1, wherein said picture-screen apparatus is surrounded by means defining a frame.

9. A conference table according to claim 1, wherein said picture-screen apparatus includes means for adjusting the inclination of said picture screen about a horizontally extending axis parallel to said picture screen and about a vertically extending axis.

10. A conference table according to claim 1, wherein said picture-screen apparatus includes an electron-beam picture-screen apparatus.

11. A conference table according to claim 1, wherein all installation means needed for the operation of said picture-screen apparatus, television cameras, microphones and loud-speakers, are housed in said conference table.

12. A conference table according to claim 11, wherein said picture-screen apparatus includes a control desk for controlling said picture-screen apparatus, television cameras, microphones and loudspeakers.

13. A conference table according to claim 1, wherein said picture-screen apparatus includes a picture scanner for transmitting pictures onto said picture screen, and/or a control monitor.

14. A conference table according to claim 1, wherein said picture-screen apparatus includes at least one television camera directed onto the conference participant and an acoustic communications device with at least one microphone and a loudspeaker.

15. A conference table according to claim 14, wherein said television camera is arranged above said table top and is adapted to be removed from said table top or lowered below said table top.

16. A conference table according to claim 1, wherein said picture-screen apparatus includes at least one control monitor in the field of vision of the conference participant.

17. A conference table according to claim 16, wherein said control monitor is arranged directly at said work station for a conference participant.

18. A conference table according to claim 16, wherein said control monitor is arranged closer to said work station location for a conference participant than said picture screen.

19. A conference table according to claim 18, wherein said control monitor has an upwardly directed picture screen, the plane of which defines with said plane of said table top an angle in the range of 120° to 150°.

20. A conference table according to claim 18, wherein said control monitor has an upwardly directed picture screen, the plane of which defines with said plane of said table top an angle of approximately 135°.

* * * * *